(12) United States Patent
Kim

(10) Patent No.: US 12,479,297 B2
(45) Date of Patent: Nov. 25, 2025

(54) HEAD-UP DISPLAY APPARATUS AND MANUFACTURING METHOD THEREFOR

(71) Applicant: HYUNDAI MOBIS CO., LTD., Seoul (KR)

(72) Inventor: Byung Ki Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 338 days.

(21) Appl. No.: 18/348,535

(22) Filed: Jul. 7, 2023

(65) Prior Publication Data

US 2024/0149672 A1    May 9, 2024

(30) Foreign Application Priority Data

Nov. 8, 2022    (KR) .................. 10-2022-0147758

(51) Int. Cl.
*B60K 35/23*    (2024.01)
*B60R 11/02*    (2006.01)
(52) U.S. Cl.
CPC .......... *B60K 35/23* (2024.01); *B60R 11/0229* (2013.01)
(58) Field of Classification Search
None
See application file for complete search history.

(56) References Cited

U.S. PATENT DOCUMENTS

| | | | | |
|---|---|---|---|---|
| 2017/0320390 A1* | 11/2017 | Sato | .................... | G02B 27/0149 |
| 2020/0269694 A1* | 8/2020 | Minei | .................... | B60K 35/50 |
| 2021/0191120 A1* | 6/2021 | Kim | .................... | G02B 7/182 |

* cited by examiner

*Primary Examiner* — Kristy A Haupt
(74) *Attorney, Agent, or Firm* — NovoTechIP International PLLC

(57) ABSTRACT

A vehicle head-up display apparatus is disclosed. An embodiment of the present disclosure provides a vehicle head-up display apparatus including a lower case having a fixing portion at one end; an aspherical mirror including a first spherical mount and a second spherical mount formed at both ends and rotatably attached to the lower case; an elastic member disposed in contact with the first spherical mount and configured to absorb an impact from a direction perpendicular to a rotational axis of the first spherical mount; and a screen including a plurality of leaf springs configured to limit a displacement of each of the first spherical mount and the second spherical mount, and located in upper portions of the first spherical mount and the second spherical mount to be coupled to the lower case, wherein the elastic member is formed to be fitting-coupled to the fixing portion or integrally formed with the fixing portion.

10 Claims, 6 Drawing Sheets

HEAD-UP DISPLAY APPARATUS AND MANUFACTURING METHOD THEREFOR

CROSS-REFERENCE TO RELATED APPLICATIONS

The present application claims priority to Patent Application No. 10-2022-0147758, filed on Nov. 8, 2022 in Korea, the entire contents of which are incorporated herein by reference.

TECHNICAL FIELD

The present disclosure relates to a vehicle head-up display device and a manufacturing method thereof.

BACKGROUND

The contents described in the present disclosure simply provide background information for the present disclosure and do not constitute prior art.

A head-up display device is a device that displays an image including a vehicle speed, a fuel level, road guidance information, and the like on a windshield of a vehicle. The head-up display device is configured to reflect head-up display information projected from a picture generating unit by using an aspherical mirror and display the display information on a windshield.

The head-up display device may prevent external impact applied to the aspherical mirror by using a screen and an elastomer structure. Here, the screen and the elastomer structure are in the form of pressing and fixing a spherical mount of the aspherical mirror. Specifically, the screen and elastomer structure limit displacement of the spherical mount by the screen. Within a limited range of the spherical mount, a range of movement of the elastomer is also limited, and the aspherical mirror can maintain a holding force of the mount without permanent deformation within a range of elasticity of the elastomer.

To prevent over restraint of the aspherical mirror, a direction perpendicular (x-axis) to a rotational axis of an aspherical surface is not constrained. This is because an effective space against external impact can be secured by providing a predetermined gap between the spherical mount and the lower case in the direction perpendicular to the rotational axis of the aspherical surface. However, when an impact exceeding the effective space is applied in the direction perpendicular to the rotational axis of the aspherical mirror, a gap may occur in the aspherical mirror, resulting in problems such as noise and wear.

SUMMARY

The present disclosure provides a vehicle head-up display device and a manufacturing method thereof capable of maintaining a holding force of an aspherical mirror even when the aspherical mirror is in an unconstrained state in a direction perpendicular to a rotational axis of a spherical mount.

The present disclosure provides a vehicle head-up display device and a manufacturing method thereof capable of suppressing permanent deformation of an aspherical mirror corresponding to impacts applied in x-axis, y-axis, and z-axis directions by using a screen and an elastic member mounting structure.

The present disclosure provides a vehicle head-up display device and a manufacturing method thereof, in which an elastic member is designed integrally with a lower case, and thus, manufacturing costs can be reduced.

The present disclosure provides a vehicle head-up display device and a manufacturing method thereof, in which a plurality of leaf springs are designed integrally with a screen, and thus, manufacturing costs can be reduced.

The problems to be solved by the present disclosure are not limited to the problems mentioned above, and other problems not mentioned will be clearly understood by those skilled in the art from the description below.

An embodiment of the present disclosure provides a vehicle head-up display apparatus including a lower case having a fixing portion at one end; an aspherical mirror including a first spherical mount and a second spherical mount formed at both ends and rotatably attached to the lower case; an elastic member disposed in contact with the first spherical mount and configured to absorb an impact applied in a direction perpendicular to a rotational axis of the first spherical mount; and a screen including a plurality of leaf springs configured to limit a displacement of each of the first spherical mount and the second spherical mount, and located in upper portions of the first spherical mount and the second spherical mount to be coupled to the lower case, wherein the elastic member is formed to be fitting-coupled to the fixing portion or integrally formed with the fixing portion.

An embodiment of the present disclosure provides a manufacturing method of a vehicle head-up display apparatus, the manufacturing method including forming a plurality of spherical mounts at both ends of an aspherical mirror so that the aspherical mirror is attached to a lower case and is rotatable; forming an elastic member in the lower case to absorb an impact applied in a direction perpendicular to a rotational axis of the plurality of spherical mounts; forming a fixing portion to which the elastic member may be fixed at one end of the lower case; forming, at both ends of a screen, a plurality of leaf springs coupled to the lower case and limiting displacement of the plurality of spherical mounts; fitting-coupling the elastic member to the fixing portion; placing the aspherical mirror on the lower case; and coupling the screen to the lower case.

According to an embodiment of the present disclosure, a vehicle head-up display device and a manufacturing method thereof may have an effect of maintaining the holding force of the aspherical mirror even when the aspherical mirror is in an unconstrained state in the direction perpendicular to the rotational axis of the spherical mount.

According to an embodiment of the present disclosure, a vehicle head-up display device and a manufacturing method thereof may have an effect of suppressing permanent deformation of the aspherical mirror corresponding to impacts applied in the x-axis, y-axis, and z-axis directions by using the screen and the elastic member mounting structure.

According to an embodiment of the present disclosure, a vehicle head-up display device and a manufacturing method thereof may have an effect of reducing manufacturing costs by having the elastic member designed integrally with the lower case.

According to an embodiment of the present disclosure, a vehicle head-up display device and a manufacturing method thereof may have an effect of reducing manufacturing costs by having a plurality of leaf springs designed integrally with the screen.

DETAILED DESCRIPTION

Figure 1:
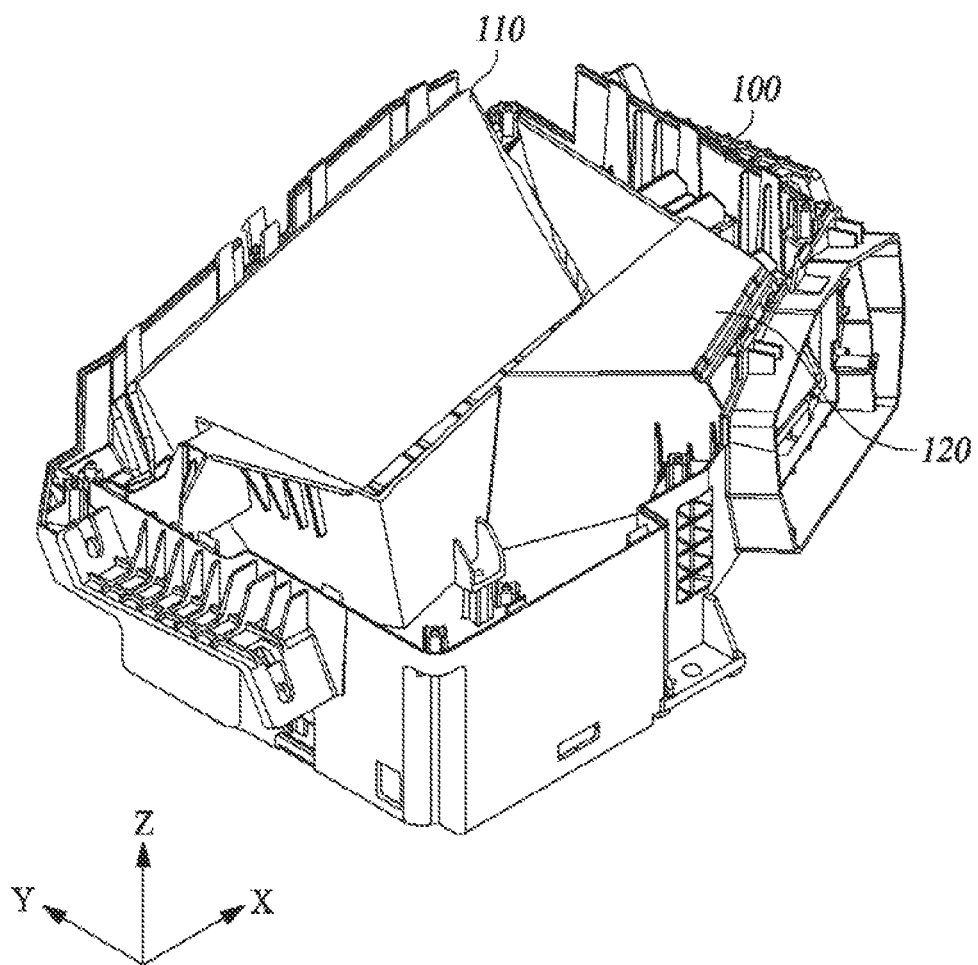
FIG. 1 is a perspective view illustrating a configuration of a vehicle head-up display device according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary.

FIG. 1 is a perspective view illustrating a configuration of a vehicle head-up display device according to one embodiment of the present disclosure.

Referring to FIG. 1, a vehicle head-up display device may include all or some of a lower case 100, an aspherical mirror 110, and a screen 120.

The lower case 100 is mounted inside a vehicle, supports a lower portion of the aspherical mirror 110, and protects the aspherical mirror 110 from external impacts.

The aspherical mirror 110 may be attached to the lower case 100 and include spherical mounts 112 and 114 formed at both ends so that the aspherical mirror 110 is rotatable.

The head-up display device is generally configured to reflect a head-up display image projected from a picture generation unit (not illustrated) on the aspherical mirror 110 using a folding mirror (not illustrated) and display the image reflected by the aspherical mirror 110 on a windshield (not illustrated). However, the picture generation unit may be configured to directly project the head-up display image onto the aspherical mirror 110 and display the reflected head-up display image on the windshield using the aspherical mirror 110.

Preferably, a position at which head-up display information corresponding to an eye level of a driver is displayed changes when the eye level of the driver changes. By appropriately rotating the aspherical mirror 110, the position where the image is reflected on the windshield can be adjusted.

The screen 120 may be coupled to the upper portion of the aspherical mirror 110. The screen 120 may include a plurality of coupling portions (not illustrated) to be coupled with the lower case 100. Here, the plurality of coupling portions may be coupled in a screw coupling manner. When the screen 120 is coupled with the lower case 100, the screen 120 may limit a movement of the aspherical mirror 110 in a z-axis direction.

Figure 2:
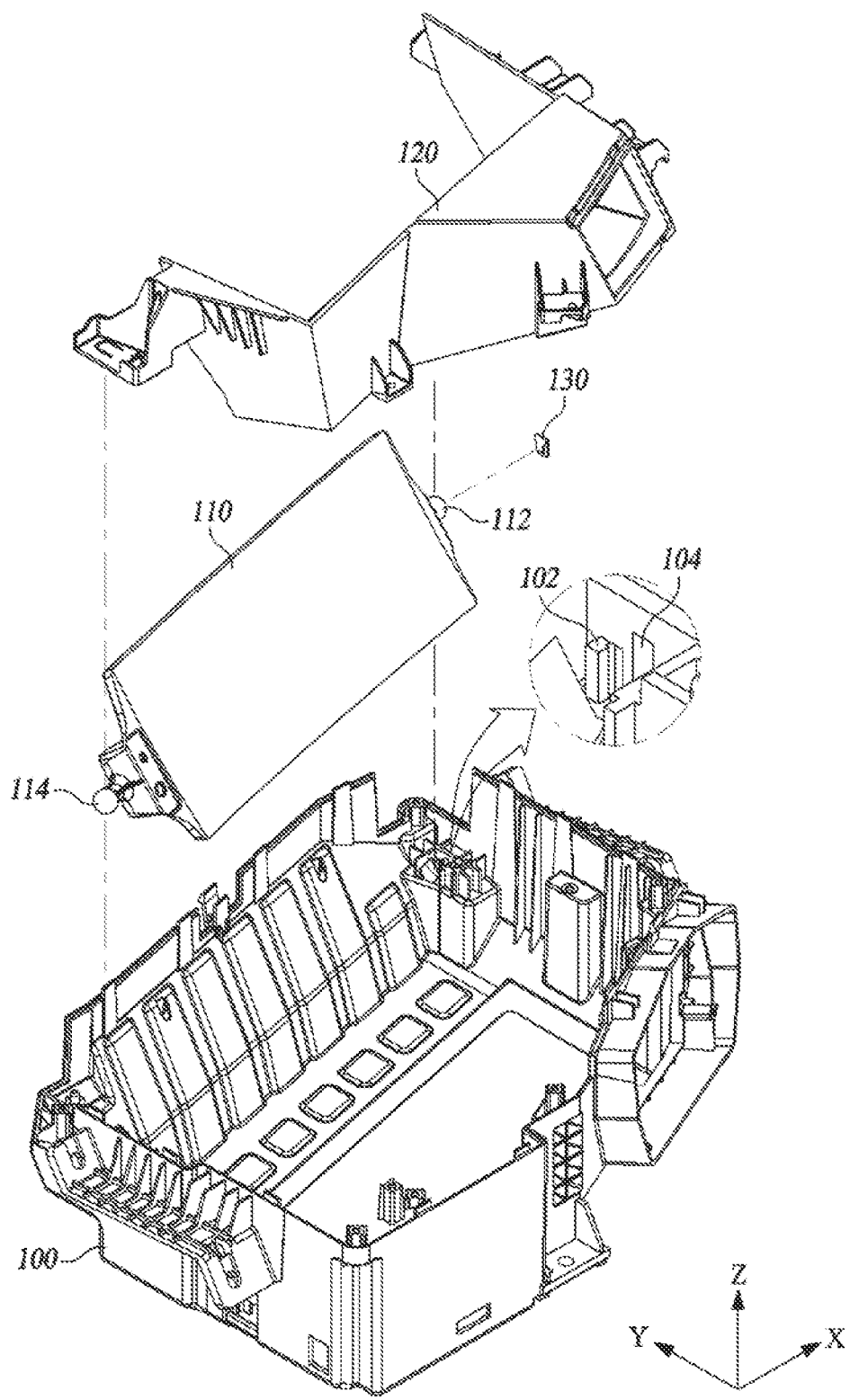
FIG. 2 is an exploded perspective view illustrating the configuration of the vehicle head-up display device according to one embodiment of the present disclosure.

FIG. 2 is an exploded perspective view illustrating the configuration of the vehicle head-up display device according to one embodiment of the present disclosure.

Referring to FIG. 2, the vehicle head-up display device may further include an elastic member 130. The elastic member 130 may be fixed to one end of the lower case 100. The elastic member 130 is preferably arranged to be in contact with the first spherical mount 112.

The lower case 100 may further include a fixing portion (not illustrated) to fix the elastic member 130. The fixing portion may include an elastic member coupling portion 102 and a locking portion 104.

The elastic member coupling portion 102 may be a structure for preventing the elastic member 130 from being separated in the x-axis and y-axis directions. According to one embodiment of the present disclosure, the elastic member coupling portion 102 may be arranged so that a plurality of fixing protrusions having an "L" cross-sectional shape and a predetermined height face each other. The cross-sectional shape of the elastic member coupling portion 102 is not limited. The cross-sectional shape of the elastic member coupling portion 102 may be formed such that the elastic member 130 is not separated in the x and y-axis directions.

The locking portion 104 is disposed at the center of the elastic member coupling portion 102 and may have a through hole shape for restraining the elastic member 130 in the z direction.

The lower case 100 may include a plurality of placement blocks (not illustrated). The plurality of placement blocks may include a first placement block (not illustrated) and a second placement block (not illustrated). The plurality of placement blocks may be disposed below the plurality of spherical mounts 112 and 114 to place the plurality of spherical mounts 112 and 114. The first placement block may be configured to place the first spherical mount 112. The second placement block may be configured to place the second spherical mount 114. The plurality of placement blocks are formed in a shape corresponding to the plurality of spherical mounts 112 and 114 so that no clearance occurs between the plurality of spherical mounts 112 and 114 and the plurality of placement blocks. For example, a plurality of placement block shapes are formed in a "V" shape, and it is preferable to place the plurality of spherical mounts 112 and 114 regardless of the manufacturing tolerance of the lower case 100. In addition, the plurality of placement blocks have an effect of preventing movement of the plurality of spherical mounts 112 and 114 in the y-axis and −z-axis directions and rotational movements in □ and □ directions.

The plurality of placement blocks include support units (not illustrated) that support the plurality of spherical mounts 112 and 114, and one or more of the support units of the plurality of placement blocks may be configured to be inclined in the direction of the rotational axis of the aspherical mirror 110, that is, in the x-axis direction.

The aspherical mirror 110 includes the plurality of spherical mounts 112 and 114 which are attached to the lower case 100 and formed at both ends to be rotatable. The plurality of spherical mounts 112 and 114 include the first spherical mount 112 and the second spherical mount 114.

The second spherical mount 114 is placed on the lower case 100 to determine the position of the aspherical mirror 110.

The first spherical mount 112 is placed on the lower case 100 and may serve as an elastomer which absorbs impact applied in the direction perpendicular to the rotational axis of the plurality of spherical mounts 112 and 114. The shape of the first spherical mount 112 may be a prolate spheroid.

The elastic member 130 may be disposed at one end of the lower case 100. Specifically, when the first spherical mount 112 of the aspherical mirror 110 is placed on the lower case 100, the elastic member 130 may be disposed in a direction perpendicular to the rotational axis of the first spherical mount 112.

The elastic member 130 may apply a holding force to the first spherical mount 112 even when the aspherical mirror 110 is in an unconstrained state in the direction perpendicular to the rotational axis.

Figure 3:
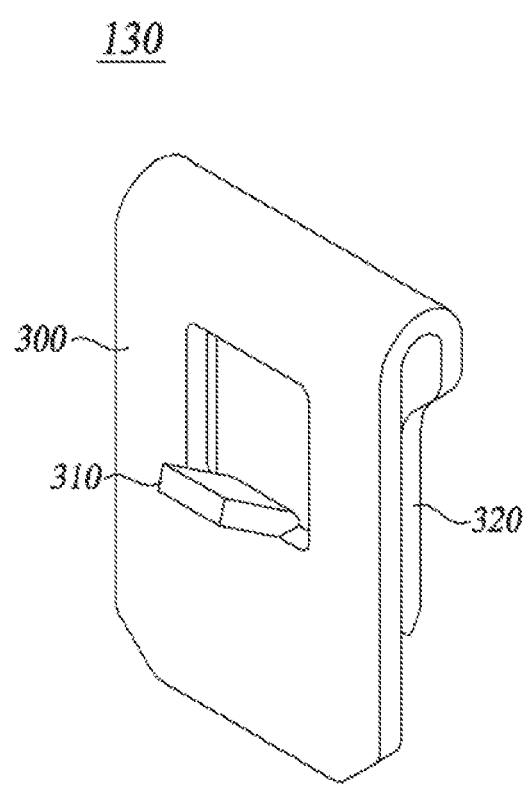
FIG. 3 is a perspective view illustrating an elastic member according to one embodiment of the vehicle head-up display device.

FIG. 3 is a perspective view illustrating an elastic member according to one embodiment of the vehicle head-up display device.

Referring to FIG. 3, the elastic member 130 may include a coupling portion 300, a locking protrusion 310, and an elastic portion 320. The elastic member 130 may fix the aspherical mirror 110 based on an elastic force corresponding to an impact applied in the direction perpendicular to the rotational axis of the first spherical mount 112.

The coupling portion 300 may correspond to the shape of the elastic member coupling portion 102 so that the elastic member 130 can be fixed to the elastic member coupling portion 102 of the lower case 100. According to one embodiment of the present disclosure, when the elastic member coupling portion 102 is formed, for example, with an "L"-shaped cross section, the coupling portion 300 may have a planar shape having a predetermined thickness to be coupled into the elastic member coupling portion 102.

The locking protrusion 310 may be formed inclined at a predetermined angle by a part of the coupling portion 300 protruding. The locking protrusion 310 may be fitting-coupled in the (−) z direction when the elastic member 130 is coupled to the lower case 100. Here, when the elastic member 130 is coupled to the coupling portion 300, the locking protrusion 310 may be coupled at the same angle as the coupling portion 300 due to elasticity. After the elastic member 130 is coupled to the fixing portion, the locking protrusion 310 returns by a predetermined angle due to an elastic force, and may be constrained in the z direction by the locking portion 104.

Figure 4:
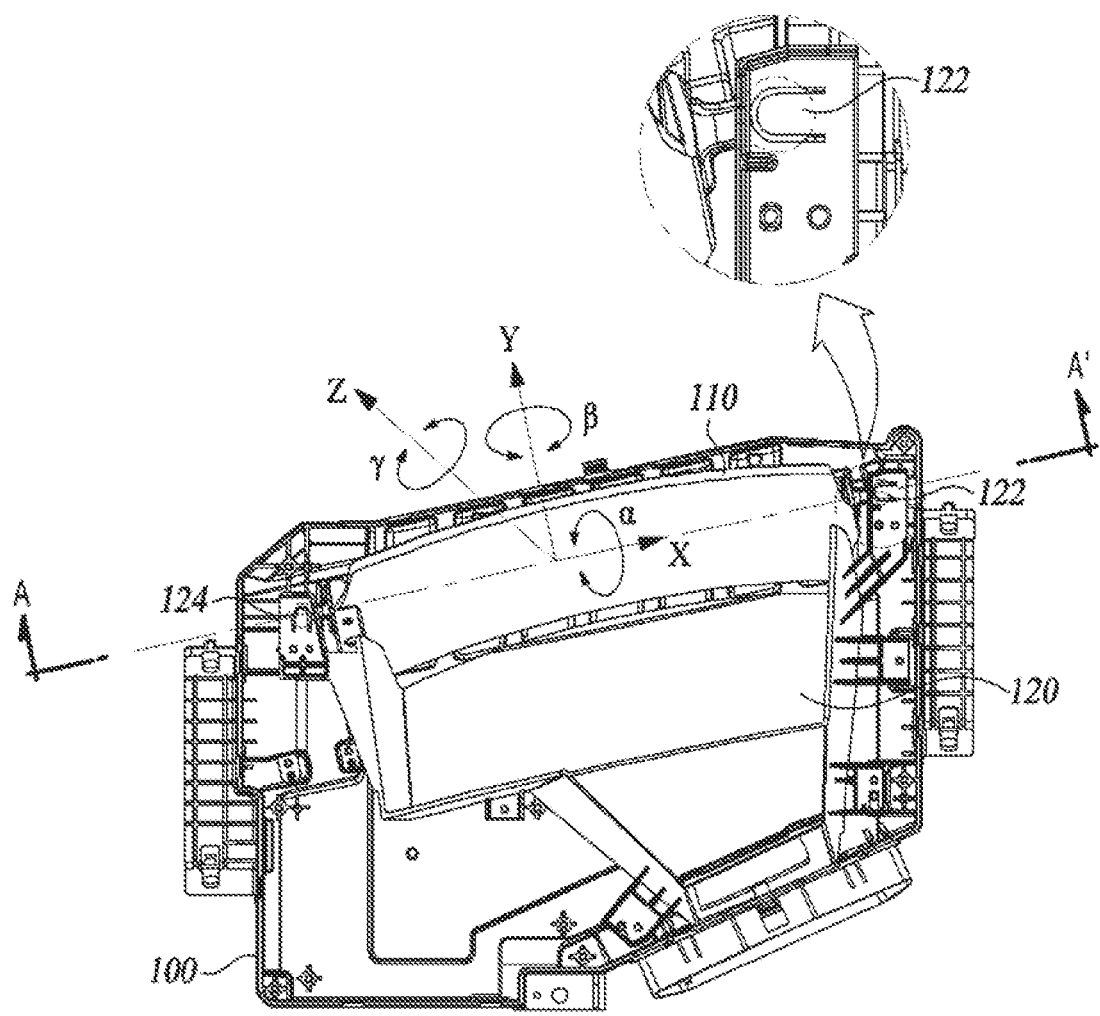
FIG. 4 is a plan view of the vehicle head-up display device according to one embodiment of the present disclosure.

FIG. 4 is a plan view of the vehicle head-up display device according to one embodiment of the present disclosure.

Referring to FIG. 4, the aspherical mirror 110 may be described with the x axis which is the rotational axis of the plurality of spherical mounts 112 and 114, the y axis parallel to the lower case 100, and the z axis perpendicular to the x axis and the y axis. The rotation directions of the x axis, y axis, and z axis are described as α, β, and γ, respectively.

The screen 120 may include a plurality of leaf springs 122 and 124 corresponding to the first spherical mount 112 and the second spherical mount 114. The holding force of the aspherical mirror 110 may be proportional to deformation amounts of the plurality of leaf springs 122 and 124. When the screen 120 is coupled to the lower case 100, separation of the plurality of spherical mounts 112 and 114 can be prevented by coupling screws.

The plurality of leaf springs 122 and 124 protrude by a difference in height between the diameters of the plurality of spherical mounts 112 and 114 and vertical fastening grooves (not illustrated) of the screen 120 and the lower case 100. Here, protruding lengths of the plurality of leaf springs 122 and 124 may be expressed as an overlap. The plurality of leaf springs 122 and 124 may fix the plurality of spherical mounts 112 and 114 based on an elastic force proportional to the overlap. Unless an impact force large enough to damage the screw coupled so that the screen 120 and the lower case 100 are fastened to each other is applied, the plurality of spherical mounts 112 and 114 of the aspherical mirror 110 cannot move to a displacement exceeding the overlap. Accordingly, the aspherical mirror 110 may be restricted from movement in the x, y, and z axis directions and rotation in the β and γ directions, and can rotate in only the α direction.

Figure 5:
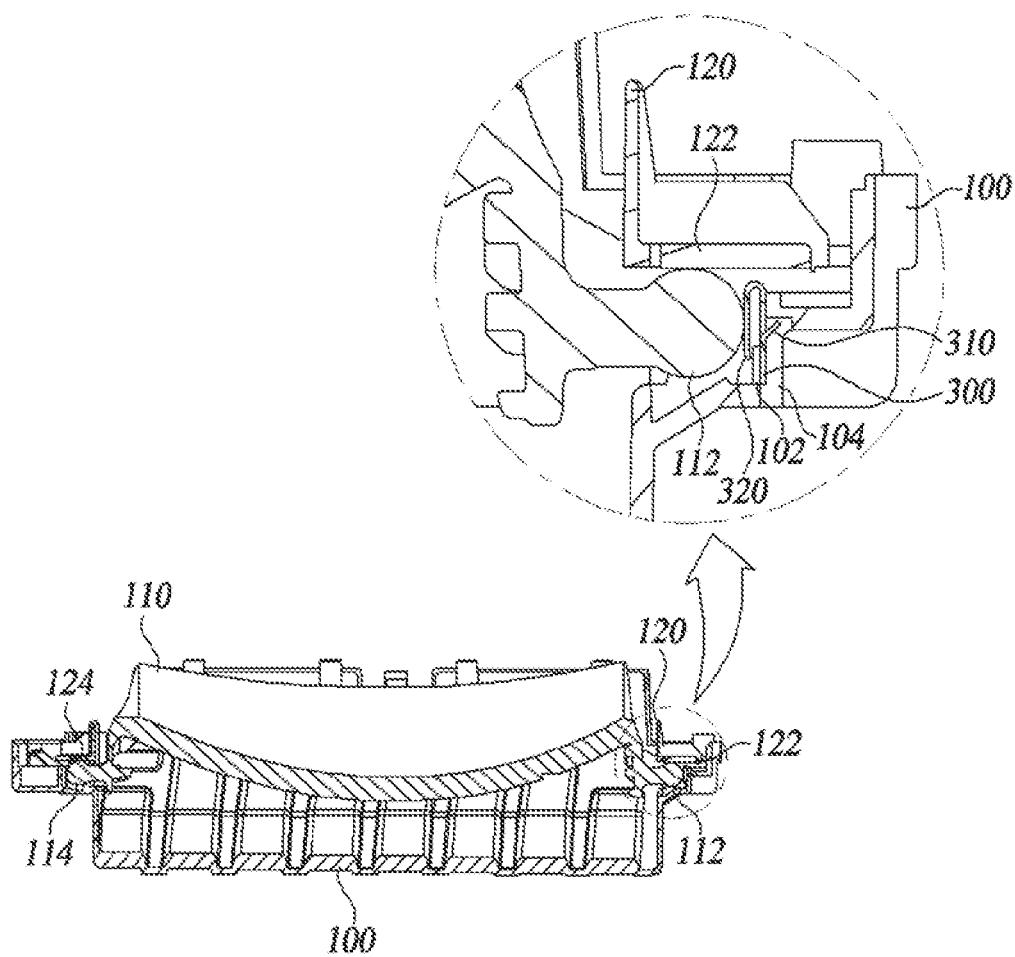
FIG. 5 is a cross-sectional view taken along line A-A' of FIG. 4.

FIG. 5 is a cross-sectional view taken along line A-A' of FIG. 4.

Referring to FIG. 4 and FIG. 5, the cross-sectional view A-A' is a cross-sectional view of the plurality of spherical mounts 112 and 114 with respect to the rotational axis.

When the first spherical mount 112 is placed on the lower case 100, both the movement in the y and z axis directions and the rotation in the β and γ directions may be restricted by the first leaf spring 122 and the first placement block. In addition, the first spherical mount 112 may prevent damage to the aspherical mirror 110 from impact in the x-axis direction by the elastic portion 320 of the elastic member 130. The elastic portion 320 may maintain the holding force of the first spherical mount 112 based on the elastic force corresponding to an impact of the first spherical mount 112 in the x-axis direction.

When the elastic member 130 is coupled to the lower case 100, the coupling portion 300 may be fitting-coupled to the elastic member coupling portion 102. After the coupling portion 300 and the elastic member coupling portion 102 are coupled to each other, the locking protrusion 310 may be fixed by the locking portion 104. The elastic member 130 may be coupled to the lower case 100 by the fixing portion disposed at one end of the lower case 100, that is, the elastic member coupling portion 102 and the locking portion 104. The elastic portion 320 of the elastic member 130 may be disposed to be in contact with a part of the first spherical mount 112. The elastic portion 320 may fix the aspherical mirror 110 from the impact applied in the x-axis direction of the first spherical mount based on a predetermined elastic force.

The movement of the aspherical mirror 110 in the z-axis direction may be constrained by the screen 120. That is, the movement of the first spherical mount 112 in the z-axis direction may be constrained by the first leaf spring 122. The movement of the second spherical mount 114 in the z-axis direction may be constrained by the second leaf spring 124. Here, the first leaf spring 122 and the second leaf spring 124 may be disposed at both ends of the screen 120 within (or in) which the screen 120 and the lower case 100 are coupled and which is in contact with the plurality of spherical mounts 112 and 114. The first leaf spring 122 and the second leaf spring 124 may have a leaf spring structure formed in a "U" shape and parallel to the x and y axes. The plurality of leaf springs 122 and 124 are integrally manufactured with the screen 120 to reduce manufacturing costs.

Figure 6:
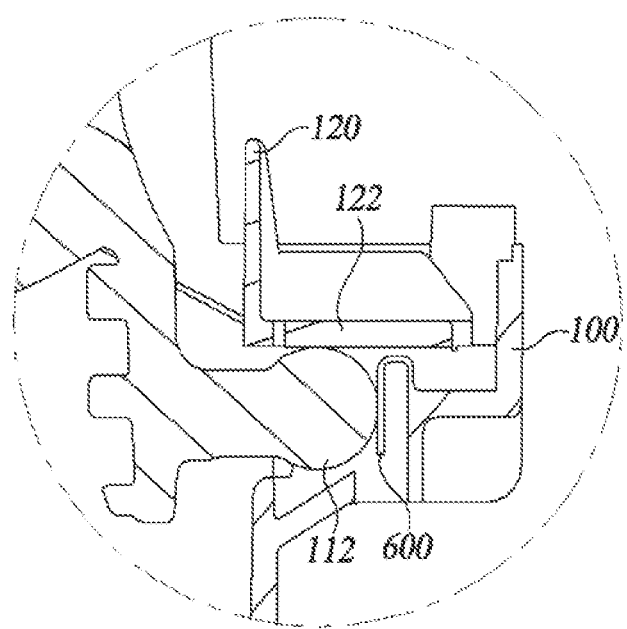
FIG. 6 is an enlarged view illustrating an integral elastic member according to another embodiment of the present disclosure.

FIG. 6 is an enlarged view illustrating an integral elastic member according to another embodiment of the present disclosure.

Referring to FIG. 5 and FIG. 6, the lower case 100 may include an integral elastic member 600. The integral elastic member 600 may be formed at one end of the lower case 100. The integral elastic member 600 may perform a function of the elastic portion 320 of the elastic member 130. The integral elastic member 600 may fix the aspherical mirror

110 based on an elastic force corresponding to an impact of the first spherical mount 112 in the x-axis direction.

Unlike the elastic member 130, since the integral elastic member 600 does not manufacture a separate unit and does not form a fixing portion for fixing the elastic member 130 to one end of the lower case 100, manufacturing costs can be reduced.

Although exemplary embodiments of the present disclosure have been described for illustrative purposes, those having ordinary skill in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skills would understand that the scope of the claimed invention is not to be limited by the above explicitly described embodiments but by the claims and equivalents thereof.

What is claimed is:

1. A vehicle head-up display apparatus comprising:
   a lower case having an end portion including a fixing portion;
   an aspherical mirror rotatably coupled to the lower case and having (1) a first end portion including a first spherical mount and (2) a second end portion including a second spherical mount;
   an elastic member in contact with the first spherical mount and configured to absorb an impact applied in a direction perpendicular to a rotational axis of the first spherical mount; and
   a screen disposed at an upper portion of the first and second spherical mounts, coupled to the lower case, and including a plurality of leaf springs configured to limit a displacement of the first and second spherical mounts,
   wherein the elastic member is fitting-coupled to or integrally formed with the fixing portion of the lower case.

2. The vehicle head-up display apparatus of claim 1, wherein the elastic member comprises:
   a coupling portion fitting-coupled to the fixing portion of the lower case,
   a locking protrusion, within which a portion of the coupling portion protrudes and is inclined at a predetermined angle, and
   an elastic portion disposed parallel to the coupling portion and in contact with the first spherical mount to absorb the impact applied in the direction perpendicular to the rotational axis of the first spherical mount.

3. The vehicle head-up display apparatus of claim 1, wherein:
   a movement of the aspherical mirror in an x-axis direction is limited by an elastic force of the elastic member, and
   the aspherical mirror is fixed to the fixing portion.

4. The vehicle head-up display apparatus of claim 1, wherein the fixing portion comprises:
   an elastic member coupling portion, within which (1) a plurality of fixing protrusions having an "L"-shaped cross section and a predetermined height face each other, and (2) the coupling portion of the elastic member is fitting-coupled to the fixing protrusions, and
   a locking portion, within which a through hole having a shape corresponding to that of the locking protrusion of the elastic member is disposed to prevent separation from a lower surface of the lower case in a vertical direction when the elastic member is coupled to the lower case.

5. The vehicle head-up display apparatus of claim 1, wherein the plurality of leaf springs include first and second leaf springs disposed at both ends of the screen, respectively, and in contact with the first and second spherical mounts, respectively.

6. The vehicle head-up display apparatus of claim 5, wherein:
   the first leaf spring is configured to limit a z-axis displacement of the first spherical mount, and
   the second leaf spring is configured to limit a z-axis displacement of the second spherical mount.

7. A method of manufacturing a vehicle head-up display apparatus, the method comprising:
   forming a plurality of spherical mounts at ends of an aspherical mirror so that the aspherical mirror is attached to a lower case and is rotatable;
   forming an elastic member at the lower case to absorb impact applied in a direction perpendicular to a rotational axis of the plurality of spherical mounts;
   forming a fixing portion, to which the elastic member is fixed at one end of the lower case;
   forming, at ends of a screen, a plurality of leaf springs coupled to the lower case and limiting a displacement of the plurality of spherical mounts;
   fitting-coupling the elastic member to the fixing portion;
   placing the aspherical mirror on the lower case; and
   coupling the screen to the lower case.

8. The method of claim 7, wherein forming the elastic member at the lower case comprises:
   forming a coupling portion fitting-coupled to the lower case;
   forming a locking protrusion within which a part of the coupling portion protrudes and is inclined at a predetermined angle; and
   forming an elastic portion disposed parallel to the coupling portion and in contact with a part of a first spherical mount among the plurality of spherical mounts to absorb an impact applied in a direction perpendicular to the rotational axis of the first spherical mount.

9. The method of claim 7, wherein forming the fixing portion comprises:
   forming an elastic member coupling portion, within which a plurality of fixing protrusions having an "L"-shaped cross section and a predetermined height face each other and to which a coupling portion of the elastic member is fitting-coupled, and
   forming a locking portion, within which a through hole having a shape corresponding to that of a locking protrusion of the elastic member is disposed so that the elastic member is prevented from being separated in a z-axis direction when the elastic member is coupled to the elastic member coupling portion.

10. The method of claim 7, wherein forming the plurality of leaf springs comprises forming the plurality of leaf springs parallel to a lower surface of the lower case and integrally disposed with the screen at both ends of the screen.

* * * * *